United States Patent

Cunningham et al.

[15] 3,696,248

[45] Oct. 3, 1972

[54] LASER TRACKING METHOD AND APPARATUS

[72] Inventors: Robert A. Cunningham, Lake Park; John T. Winkler, Orlando, both of Fla.

[73] Assignee: Martin Marietta Corporation, New York, N.Y.

[22] Filed: Aug. 26, 1970

[21] Appl. No.: 66,955

[52] U.S. Cl.................250/203 R, 331/94.5, 356/152
[51] Int. Cl.................................................G01j 1/20
[58] Field of Search........356/152, 1; 244/14 L, 3.13; 250/203; 331/94.5; 33/51, 63

[56] References Cited

UNITED STATES PATENTS

3,514,608   5/1970   Whetter.................250/203 R

*Primary Examiner*—Walter Stolwein
*Assistant Examiner*—D. C. Nelms
*Attorney*—Julian C. Renfro and Gay Chin

[57] ABSTRACT

A device and method for remotely positioning a device utilized to illuminate a remote target. The illuminating device is scanned until illumination is detected in the field of view of a detector sighted on the remote target. On acquisition of the illumination, the scan signals are replaced by error signals related to the departure of the detected illumination from the target sight axis and the illuminating device positioned responsively thereto.

19 Claims, 6 Drawing Figures

FIG. 4

INVENTORS
ROBERT A. CUNNINGHAM
JOHN T. WINKLER

BY *Julian C. Renfro*
ATTORNEY

LASER TRACKING METHOD AND APPARATUS

BACKGROUND OF THE INVENTION

With the advent of improved and more reliable laser systems such as are currently available, the laser has been used with increasing frequency in both civilian and military applications. In military applications, for example, lasers may be used in weapon fire control systems to illuminate a remote target, the reflected energy being utilized for tracking and/or guided missile control.

A conventional practice for illuminating a target with a laser involves the visual acquisition of the target through the optical system attached to and mechanically bore-sighted with the laser illuminator. The operator must then manually follow the target with the optical system while simultaneously positioning the laser illuminator. The need for increased power in long-range military applications has added appreciably to the overall size and mass of the laser and has consequently reduced the ease and accuracy with which an operator is able to position the laser while tracking a specific target.

The increased size and mass has additionally detracted from the portability of such illuminator systems, thereby significantly decreasing the military usefulness of the illuminator in certain terrain and tactical situations. Furthermore, the position of the operator is restricted to the immediate vicinity of the laser and is immediately revealed when the laser illuminator is utilized in the field.

The increased size and mass of the laser remains a problem even where the laser is not directly connected to the optical system, but is connected thereto by means of a servo system. Such servo systems are often prohibitive, by reason of their mass and the required degree of control, from utilization in many tactical situations, for example, where the degree of parallax is a consideration.

One of the more promising civilian applications is in the field of medicine, and particularly in surgical applications where lasers are presently being used as an extremely accurate cutting tool. In these applications, the surgeon must manually position both the optical system and the laser to make extremely accurate cuts in highly delicate areas.

It is, therefore, an object of the present invention to provide a novel laser positioning method and system which obviates the above difficulties.

It is another object of the present invention to provide a novel method and apparatus for designating a target to a laser illuminator.

It is still another object of the present invention to provide a novel apparatus which is lightweight, highly portable and well suited for both tactical military and civilian applications.

It is a further object of the present invention to provide a novel method and apparatus for positioning a laser illuminator with increased accuracy and without recourse to devices, mechanical or electrical, which translate the operator's pointing axis to that of the illuminator.

It is yet a further object of the present invention to provide a novel method and apparatus for remotely positioning a laser illuminator whereby the position of the operator is not revealed.

It is still a further object of the present invention to provide a novel method and apparatus for positioning a laser prior to the application of other energy sources collimated with the laser used to position the system.

These and other objects and advantages of the present invention will become apparent from a perusal of the following detailed description when read in conjunction with the accompanying drawings.

DETAILED DESCRIPTION

Figures 1, 2:
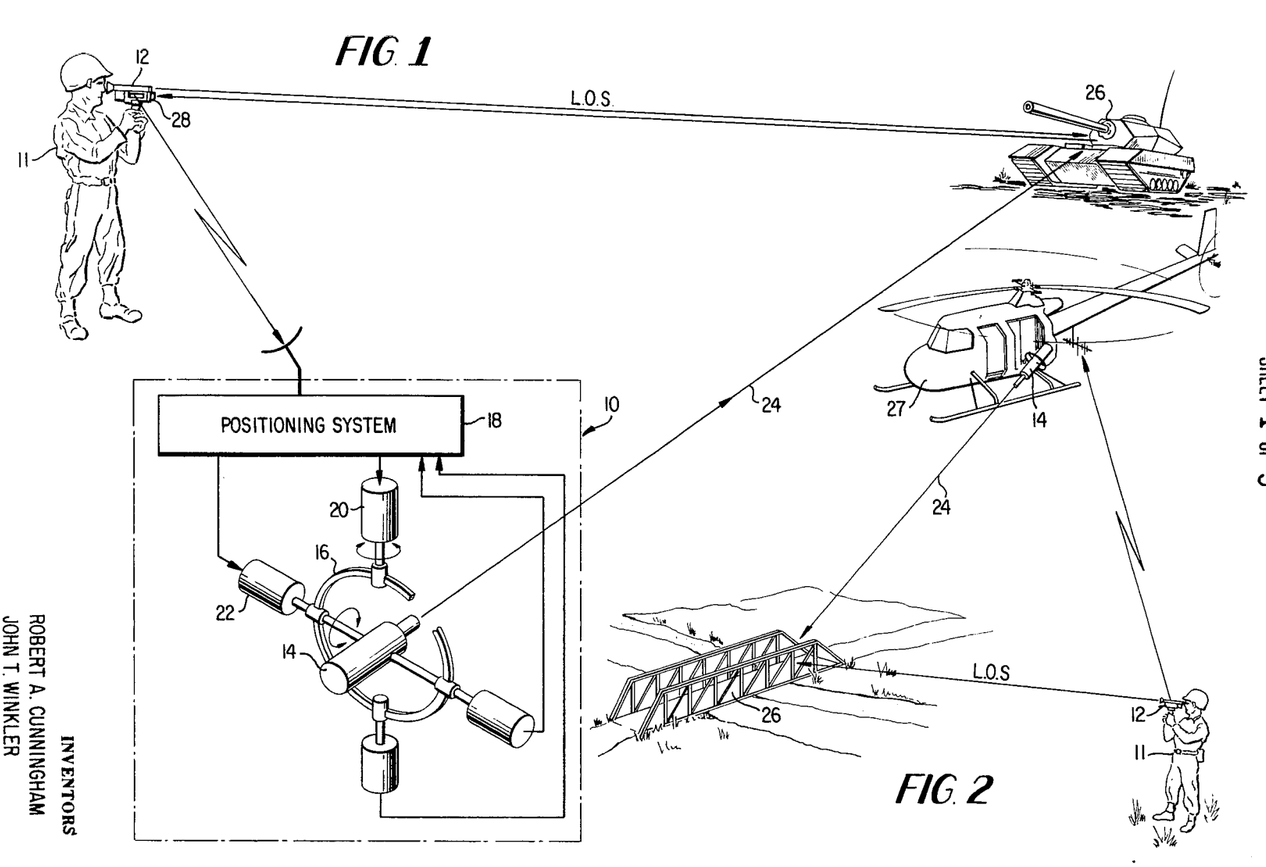
FIG. 1 is a first pictorial representation of the laser positioning system of the present invention.
FIG. 2 is a second pictorial representation of the laser positioning system of the present invention.

As illustrated in FIG. 1, the laser positioning system of the present invention comprises a positionable laser illuminator 10 which may be controlled from a remote position by an operator 11 utilizing an optical sighting device 12. The optical sighting device may, of course, be of the hand-held type illustrated or may comprise a helmet or other apparatus worn by the operator 11.

Figure 3:
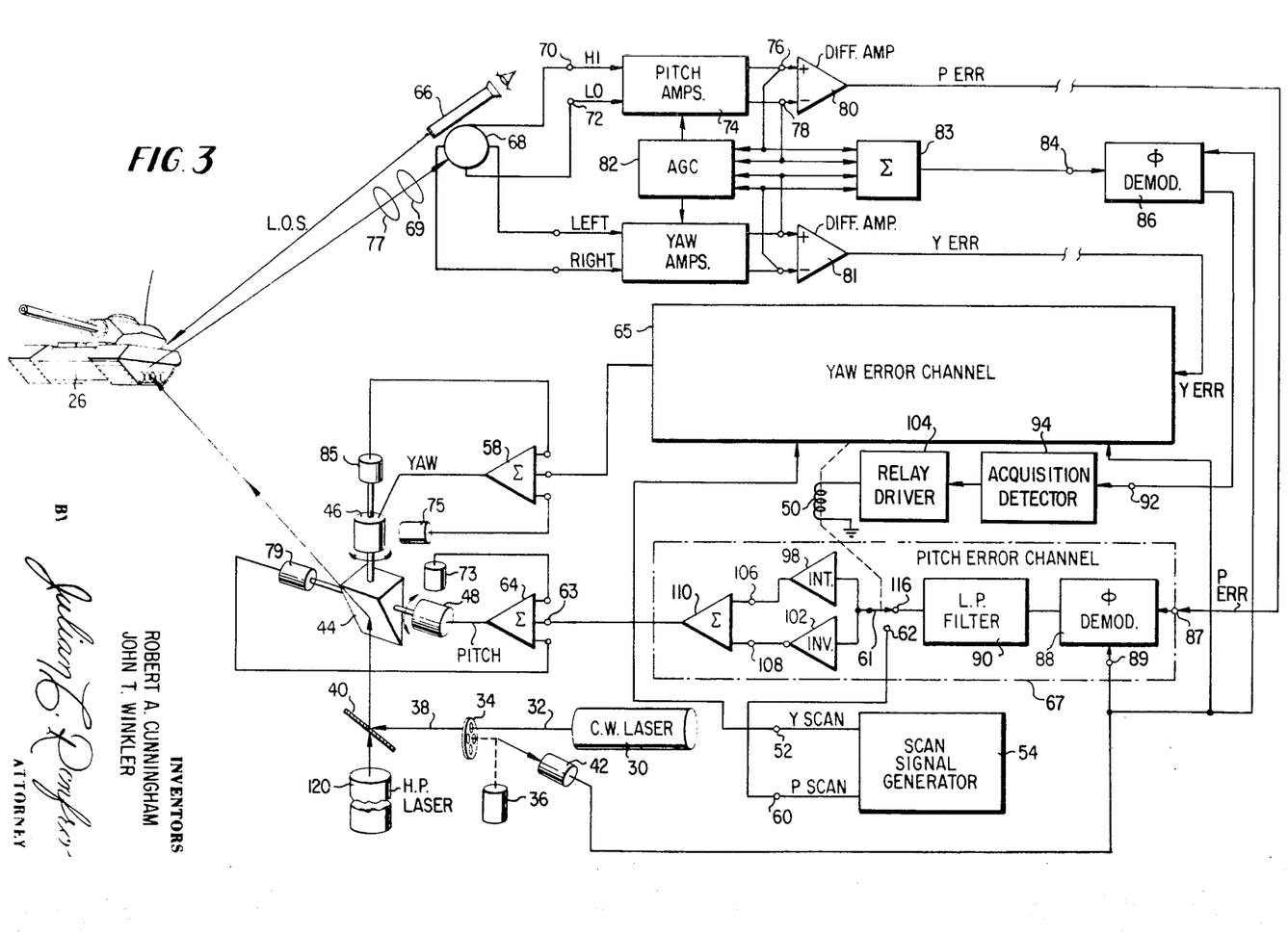
FIG. 3 is a functional block diagram of one embodiment of the positioning system of FIG. 1 utilizing a continuous wave laser.

The laser illuminator 10 may include a narrow beam laser 14 mounted in a conventional manner so that the laser beam may be directed, e.g., by mounting the laser 14 on gimbals 16 or by fixedly mounting the laser 14 and directing the energy therefrom onto a gimbal mounted, movable mirror of the type schematically illustrated in FIGS. 2 and 3. A positioning system 18 may be provided to position the laser 14 at a desired yaw and pitch angle by applying appropriate control signals to a yaw position motor 20 and a pitch position motor 22, thereby causing the laser beam 24 to strike a remote target 26 such as the tank illustrated in FIG. 1 or the bridge illustrated in FIG. 2.

The positioning system is controlled by error signals generated by a light detector 28 carried by the optical sighting device 12. The error signals from the light detector 28 may be applied to the positioning system 18 by way of a suitable conventional communications link, such as the electro-magnetic radio wave link illustrated schematically in FIGS. 1, 2 and 4, or suitable electrical conductors as illustrated in FIG. 3.

A second illustration of the laser positioning system of the present invention is found in FIG. 2 where the operator 11 utilizing the optical sighting device 12 is focused on a bridge 26. The error signals generated by the light detector may then be transmitted by way of a suitable communications link to an antenna carried by a helicopter 27 or other type of aircraft.

These error signals are then processed, if not processed in the circuitry associated with the hand-held device prior to transmission, to direct the beam 24 of the laser 14 onto the target 26.

A first embodiment of the laser illuminator positioning system of FIG. 1 is illustrated in greater detail in the functional block diagram of FIG. 3. Referring now to FIG. 3, the laser illuminator includes a continuous wave laser 30 providing a laser beam 32 and a suitable interrupter apparatus 34. For example, the beam 32 may be chopped by passing it through an apertured disc driven at the desired rotational speed in a suitable conventional manner such as by a motor 36. The light from the back surface of the chopper is applied to a reference photodetector 42 having an output signal related to the rate at which the laser beam is being chopped and the utilization of which will be later explained. A chopped collimated light may be used instead of a laser where extensive range is not required. The chopped laser beam 38 may be directed onto a reflecting mirror surface 40, which reflects the chopped laser beam 38.

The portion of the laser beam 38 reflected from the mirror 40 is preferably directed onto a movable, totally reflective mirror surface 44 having yaw angle and pitch angle control motors 46 and 48, respectively, connected thereto in a suitable conventional manner. The mirror 44 thus deflects the laser beam in a direction determined by appropriate yaw and pitch motor control signals YAW and PITCH applied to the respective yaw and pitch control motors 46 and 48.

The yaw and pitch motor control signals YAW and PITCH are derived in one of the following manners depending upon the position of a mode select relay 50. When the relay 50 is de-energized, the positioning system is in the "scan" mode and the Y SCAN and P SCAN signals are derived from output terminals 52 and 60 of a conventional scan signal generator 54 which provides signals which generate a search pattern like the raster of a television receiver.

The P SCAN signal from the output terminal 60 of the scan signal generator is applied to a terminal 62 of the relay 50. The common terminal 61 of the relay 50 is connected by way of a pair of amplifiers 98 and 102, later to be described in more detail, to an input terminal 63 of a conventional summing amplifier 64 to which the output signal from a pitch position sensor 79 and a gyroscope 73 are also applied. The resulting output signal PITCH from the amplifier 64 is applied to the pitch control motor 48.

In the "scan" mode, the Y SCAN signal from the scan generator 54 is similarly utilized in conjunction with a gyroscope 75 to produce the output signal YAW applied to the yaw control motor 46.

In the "track" mode, i.e., when the relay 50 is energized, the YAW and PITCH signals are derived respectively from the phase demodulated and filtered signals P ERR and Y ERR in the error signal channels 65 and 67 and are applied to the terminal 116 of the relay 50. The signal from the gyroscope is thus utilized for stabilization of the laser beam in both the "scan" and "track" modes.

With continued reference to FIG. 3, a portion of the circuitry comprising the error signal channels 65 and 67 may be provided within the sighting device 12 of FIGS. 1 and 2. The remainder of the circuitry comprising the error signal channels 65 and 67 may be located within the laser illuminator assembly. It may be desirable to place most of the circuitry in the illuminator assembly since it is important that the weight of the optical sighting device 12 be minimized. For bandwidth considerations, especially in the pulse laser system later to be described, it may be more desirable to transmit the processed error signals.

With continued reference to FIG. 3, the optical sighting device 12 of FIG. 1 is provided with both an optical sight 66 and a light detector 68 in optical alignment therewith. The optical sight 66 may be any suitable conventional optical system having cross hairs or other means for determining the center of the field of view. The light detector 68 may be provided with a lens 77 and an optical filter 69 and is preferably a conventional "Schottky barrier" type photodiode detector, for example, a model PIN-SPOT/10 four terminal photodiode detector available from United Detector Technology, P. O. Box 5251, Santa Monica, Calif., 90405. The detector 68 thereby provides four signals proportional to the intensity and position of the light striking the photodiode detector.

The signal from the upper terminal of the detector 68 relates to the position of the light striking the detector in the upper half thereof, (hereinafter referred to as the HI signal) and may be applied to an input terminal 70 of one of a pair of conventional high gain, low noise amplifiers 74 for amplification. The signal from the lower terminal of the detector 68 relates to the position of the light striking the detector in the lower half thereof (hereinafter referred to as the LO signal). The amplified HI and LO output signals from the amplifiers 74 may then be applied to the input terminals 76 and 78 of a conventional differential amplifier 80, the output signal of which is a pitch error signal, P ERR, related in magnitude and sign to the algebraic difference between the amplified HI and LO signals.

For example, if the amplified HI signal exceeds the amplified LO signal, the pitch error signal P ERR may be a positive signal related in amplitude to the difference between the HI and LO signals from the detector 68. However, if the amplified LO signal exceeds the amplified HI signal, the differential amplifier 80 output signal P ERR is a negative signal related in amplitude to the difference between the HI and LO detector 68 output signals.

The LEFT and RIGHT signals developed respectively by the left and right halves of the detector are similarly treated to produce a yaw error signal Y ERR.

In addition, conventional automatic gain control signals may be applied to both the yaw amplifiers and pitch amplifiers from a suitable conventional automatic gain control circuit 82 in order to normalize the error signals derived from these channels, i.e., to prevent gain variations due to range variations.

The yaw channel is similar to the pitch channel hereinabove described and will not be further explained.

With continued reference to FIG. 3, the four input signals to the differential amplifiers 80 and 81 are summed in a conventional summing circuit 83 and the summation signal applied to an input terminal 84 of a conventional phase demodulator 86. The output signal from the phase demodulator 86 is applied to an input terminal 92 of an acquisition signal detector 94. The output signal from the acquisition detector 94 may be applied to the coil of the relay 50 by way of a suitable conventional relay driver circuit 104 and indicates when the scanning beam is within the field of view of sight optics 69.

In operation, the operator aims the sighting device 12 at the tank 26 by sighting through the optical sight 66. By placing the intersection of the cross hairs on the tank 26, the operator establishes a line of sight from the optical sighting device 12 to the tank 26. The light detector 68 is collimated with the optical sight 66 such that the optical center of the light detector 68 is coincident with the optical line of sight.

The scan signal generator is then energized and applies scanning signals to the yaw and pitch motors 46 and 48 by way of the normally closed contacts of the relay 50. The Y SCAN and P SCAN signals cause the reflector 44 to be driven in a predetermined manner, thus causing the laser beam to scan a predetermined area in azmuth and elevation. As the laser beam scans across the target 26, the reflected energy from the laser beam will strike the detector 68, thus generating error signals which are applied to the yaw and pitch channels 65 and 67, respectively, and to the acquisition detector 94. The output signal from the acquisition detector 94 is applied to the relay drive circuit 104 which energizes the relay 50, to disconnect the scan signal generator and to place the positioning system in the "track" mode.

Once in the "track" mode, the system operates as a closed loop tracking system. The laser energy reflected from the target 26 which strikes the detector 68 will provide output signals proportional to the intensity and position of the energy detected by the detector. The HI, LO, RIGHT and LEFT signals from the detector 68 are applied to the appropriate one of the pitch and yaw channels 65 and 67.

The high gain, low noise pitch amplifiers 74 amplify the HI and LO signals from the detector 68 by an equal amplification factor controlled by the automatic gain control circuit 82, which receives the signals from all four of the amplifiers. The output signals of the pitch and yaw amplifiers are summed and processed in the AGC circuit 82 to produce a d.c. voltage which is compared with a predetermined reference voltage. The difference signal is used to control the gain of the pitch and yaw amplifiers so that the combined energy is a constant.

The normalized HI and LO signals are then applied to the differential amplifier 80 to produce the pitch error signal P ERR:

P ERR = HI (Normalized) − LO (Normalized)   1.

The P ERR signal may then be applied to the phase demodulator 88 which is gated by the output signal from the reference photodetector 42. The phase demodulator 88 processes the received signals at the same rate as the transmitted energy is chopped by the interrupter apparatus 34, thereby acting as a highly selective filter and excluding any spurious noise and background signals detected by the detector 68 outside this time period. The low pass filter 90 smooths the P ERR signal from the phase demodulator 88, removing the high frequency components therefrom.

The smoothed P ERR signal is then applied to both the integrator 98 and the inverter 102, and the output signals therefrom summed in the summing amplifier 110 and applied, together with signals from the gyroscope 73 and the pitch position sensor 79, to the pitch control motor 48 to drive the pitch control motor in a direction tending to reduce the P ERR signal to zero.

The inverter 102 inverts the filtered P ERR signal to provide a drive signal of the same polarity as the integrator 98 signal. For example, assuming that the HI signal exceeds the LO signal, the output signal of the filter 90 will be positive. Since this positive signal is indicative of the fact that the energy detected in the upper half of the detector 68 is greater than the energy detected in the lower half, the reflector 44 must be rotated in a direction to lower the laser beam in elevation to eliminate this error.

The inverter 102 is necessary because the integrator 98 inverts the signal and the control signal component from the inverter 102 must have the same directional control as the control signal component from the integrator 98.

The integrator 98 is provided to eliminate residual error signals which do not have sufficient instantaneous amplitude to cause rotation of the pitch control motor 48 to change the position of the reflector 44. By integrating these residual error signals, the effect of these signals is summed over a period of time, thereby providing a large enough signal to eliminate the residual errors.

After the system has automatically changed to the "track" mode and is operating as a closed loop system, the laser beam automatically tracks the target as seen by the operator. This feature is particularly important, for example, when utilizing the system for surgical purposes where the surgeon operating the system may increase the output power of the laser 30 several orders of magnitude, or may alternatively switch on a high power laser 120 aligned with the beam of the laser 30, to perform a desired surgical function. In this way, an extremely delicate and accurate operation may be performed on a patient by first tracking and selecting the spot with a low power laser 30. When the surgeon desires to make a cut, the high power laser 120 may be switched on to perform the operation and then switched off when the operation is completed. In this manner, extreme accuracy may be obtained without the risk of misalignment of the high powered laser.

Figure 4:
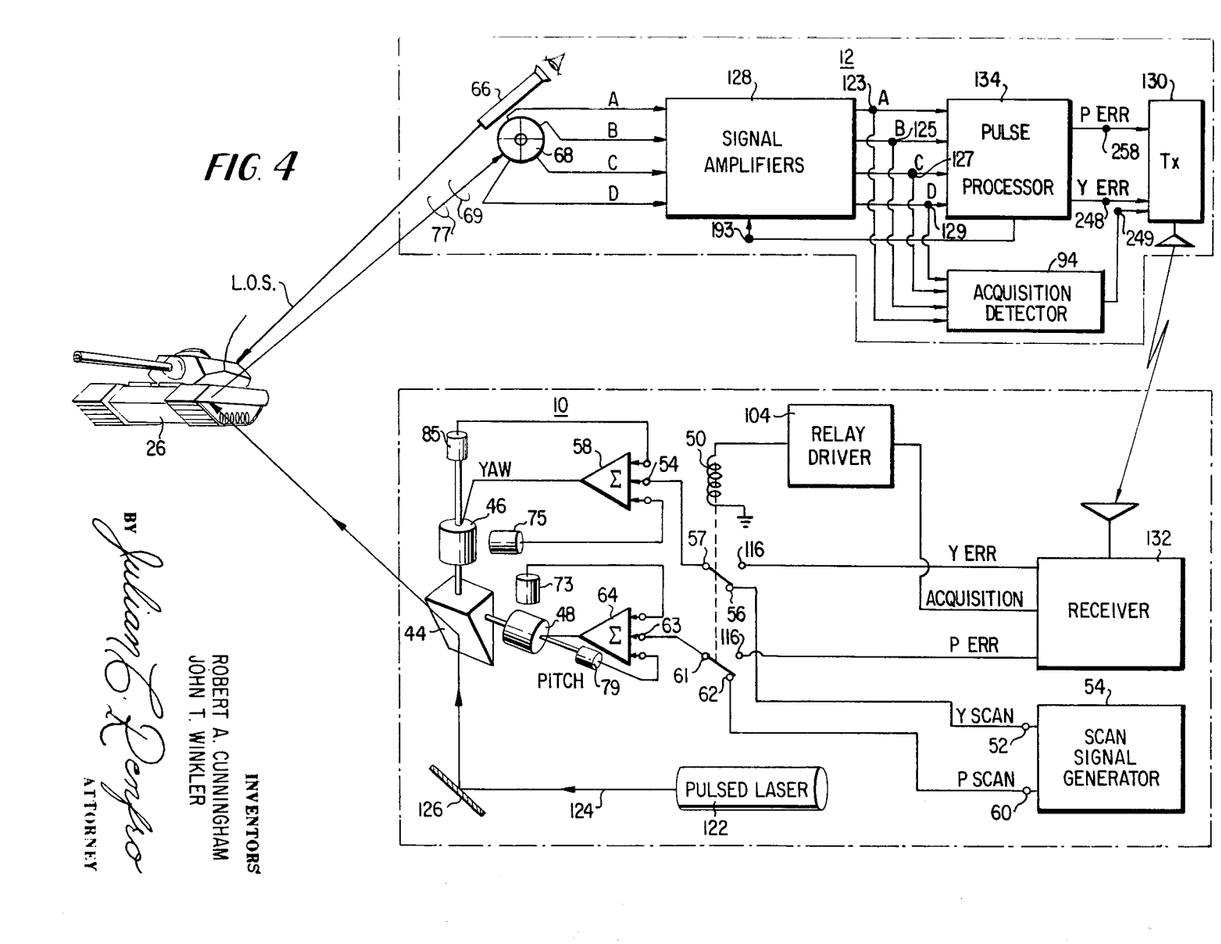
FIG. 4 is a functional block diagram of a second embodiment of the positioning system of FIG. 1 utilizing a pulsed laser.

Referring now to FIG. 4 where a second embodiment of the present invention utilizing a pulsed laser as the laser illuminator is illustrated and where like numerical designations have been utilized where applicable to facilitate an understanding of the invention, a conventional pulsed laser 122 which provides a narrow laser beam 124 of short duration, high intensity, highly directive light is provided in the laser illuminator assembly 10. The beam 124 from the laser 122 may be directed onto a totally reflective mirror surface 126 which directs the beam 124 onto a totally reflective, gimbal mounted mirror surface 44. The yaw and pitch angles of the mirror 44 are controlled by the respective yaw and pitch control motors 46 and 48 in response to YAW and PITCH control signals to direct the beam 124 onto the target 26 as previously described.

The sighting device 66 may be aimed at target 26 and the reflected laser beam detected by the light detector 68 as previously described. The signals generated by the A, B, C, and D quadrants of the detector 68 may be applied to signal amplifiers 128 and the amplified signals applied to the input terminals 123, 125, 127 and 129 of the pulse processor 134 which may include a suitable conventional circuit described infra in connection with FIG. 5 to control the gain of the input signals from the amplifiers 128 by an equal amount related to the sum of all of the input signals as previously described in connection with FIG. 3. The P ERR and Y ERR signals may then be applied to the input terminals 258 and 248 of a radio transmitter 130 or other suitable conventional communications link to transmit the signals to the receiver 132 in the laser illuminator assembly 10. An acquisition detector 94 receives the four signals and generates an ACQUISITION signal which is also applied to the transmitter 130 via an input terminal 249.

The radio receiver 132 in the laser illuminator assembly 10 receives the transmitted signals and applies the P ERR and Y ERR signals to the normally open contacts 116 of the mode select relay 50. The ACQUISITION signal is applied to a relay driver circuit 104 for operation of the mode select relay 50.

As previously described, the Y ERR and P ERR signals are applied to the input terminals 59 and 63, respectively, of the summing amplifiers 58 and 64 by way of the respective normally open terminals 57 and 61 of the mode select relay 50 when the relay 50 is energized. When the relay 50 is deenergized, Y SCAN and P SCAN signals are applied to the respective input terminals 59 and 63 from the scan signal generator 54 as previously described. In addition, the output signals from the gyroscopes 75 and 73 and the position sensors 85 and 79 are applied to the respective input terminals of the summing amplifiers 58 and 64 to produce the YAW and PITCH signals applied to the yaw control motor 46 and the pitch control motor 48, as previously described.

The lens 77 of the detector is utilized to defocus and thus enlarge the spot of light incident on the detector 68 so that signals related to the intensity of each quadrant of the detector will be generated when the target is boresighted. The availability of four quadrant signals permits the proportional control hereinafter described.

As previously described, the output pulses from the A, B, C, and D quadrants of the detector 68, hereinafter referred to as the A, B, C, and D signals, are processed so that the analog error signals may be transmitted to the receiver 132 and applied therefrom to the input terminals 116 of the mode select relay 50. The pulse processor 134 may contain a signal control circuit of the type illustrated in FIG. 5.

The pulse processor 134 of the embodiment of FIG. 4 will now be described with reference to FIGS. 5 and 6 wherein the terminals corresponding to those illustrated in FIG. 4 have been given like numerical designations.

Figure 5:
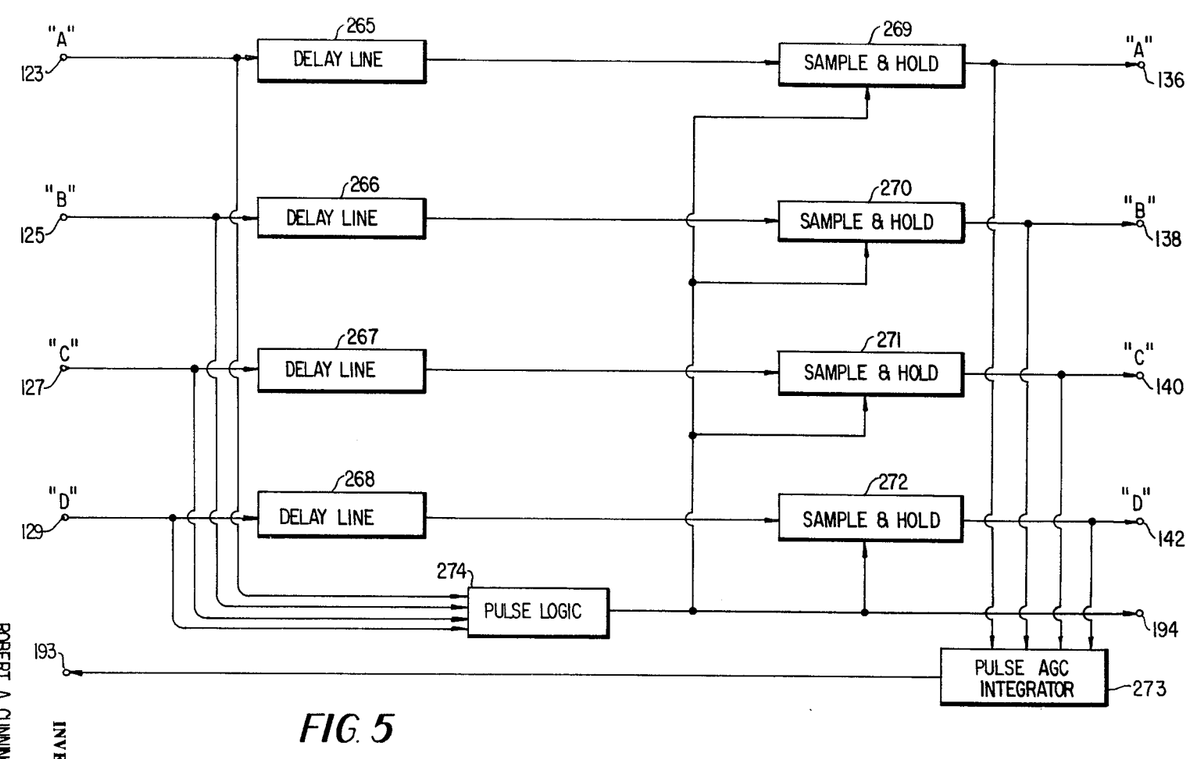
FIG. 5 is a functional block diagram of the signal control circuit of the pulse processor of FIG. 4.

With reference now to FIG. 5, the four signals A, B, C, and D are applied respectively to the input terminals 123, 125, 127 and 129. These signals are delayed respectively in delay lines 265–268 and applied respectively to sample and hold circuits 269 – 272. The output terminals 136 – 142 of the sample and hold circuits 269 – 272 are directly connected to the like numbered terminals of the normalizer circuits illustrated in FIG. 6. The output signals of the sample and hold circuits are also applied to a suitable conventional pulse AGC integrator 273 whose output signal is applied to terminal 193 of the signal amplifiers 128 of FIG. 4.

Figure 6:
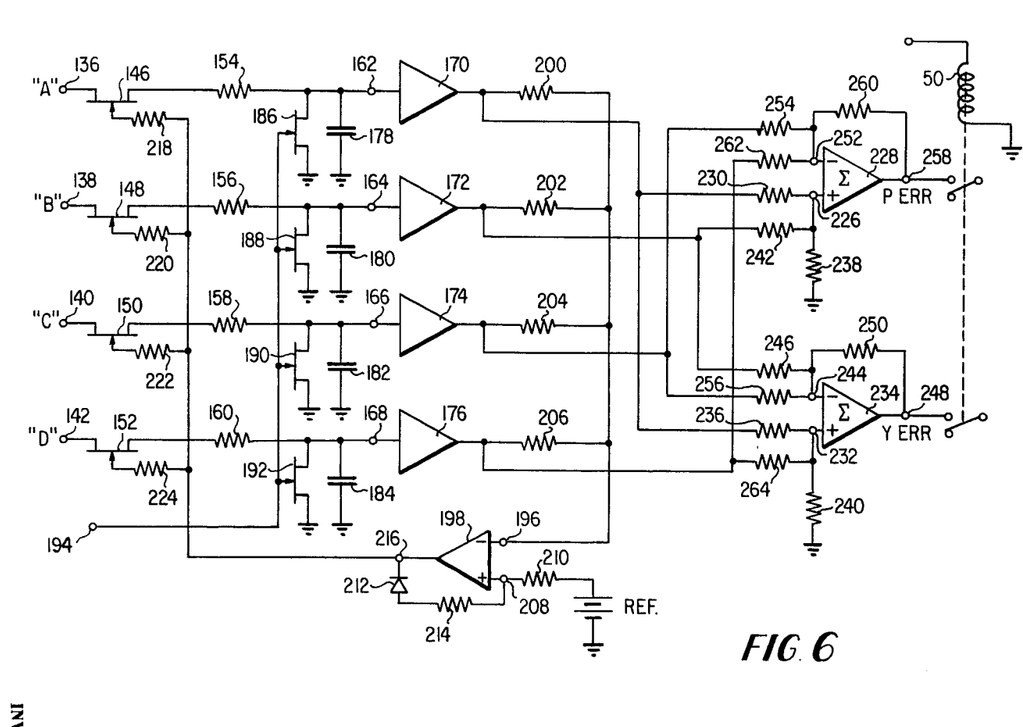
FIG. 6 is a functional block diagram of the normalizer of the pulse processor of FIG. 4.

The input signals A, B, C, and D are also applied to a pulse logic circuit 274 which supplies normalizer gating signals to the input terminal 194 of the normalizer of FIG. 6 and to the sample and hold circuits 269 - 272 to reset the voltage levels associated with the preceding pulse.

In operation, the input signals A, B, C, and D are delayed sufficiently in the delay lines 265 – 268 to permit the pulse logic circuit 274 to evaluate the signals individually with respect to criteria such as pulse repetition rate, pulse width, and pulse amplitude. If the signals are found acceptable, a gating signal is supplied to the sample and hold circuits 269 – 272 which sample the signals and apply the samples to the terminals 136 – 142 of the normalizer of FIG. 6.

In addition, the gating signal is applied via terminal 194 to prepare the normalizer of FIG. 6 to receive the video samples.

The sampled signals are integrated in the pulse AGC integrator 273 and the sum applied by way of terminal 193 to the signal amplifiers 128 to adjust the gain thereof in a conventional manner.

With reference to FIG. 6, the output terminals 136 – 142 are directly connected to the drain electrode of an associated one of four field effect transistors 146 – 152. The source electrodes of the field effect transistors 146 – 152 are connected to input terminals 162 – 168 of conventional high input impedance amplifiers 170 – 176 by way of equal resistors 154 – 160. Each of the input terminals 162 – 168 of the respective amplifiers 170 – 176 is connected to ground through an associated one of the capacitors 178 – 184 and is additionally connected to the drain electrodes of associated field effect transistors 186 – 192, the source electrodes of which are grounded. The gate electrodes of each of the field effect transistors 186 – 192 are connected to an input terminal 194 from the pulse logic circuit of FIG. 5.

The output signals from the amplifiers 170 – 176 may be applied to a first input terminal 196 of a conventional differential amplifier 198 by way of equal resistors 200 – 206, respectively. A d.c. reference voltage source may be connected to a second input terminal 208 of the amplifier 198 by way of a resistor 210. The input terminal 208 is connected to the anode electrode of a semi-conductor diode 212 by way of a resistor 214 and an output terminal 216 of the amplifier 198 is connected to the cathode of the diode 212. The output terminal 216 of the amplifier 198 is connected to the gate electrodes of the field effect transistors 146 – 152 by way of one of the resistors 218 – 224.

The output signal from the amplifier 170 may also be applied to an input terminal 226 of a conventional summing amplifier 228 by way of a resistor 230 and may also be applied to an input terminal 232 of a conventional summing amplifier 234 by way of a resistor 236. The input terminals 226 and 232 of the amplifiers 228 and 234, respectively, may be connected to ground through respective resistors 238 and 240.

The output signal from the amplifier 172 may also be applied to the input terminal 226 of the amplifier 228 by way of a resistor 242 and to an input terminal 244 of the amplifier 234 by way of a resistor 246. The input terminal 244 of the amplifier 234 may be connected to an output terminal 248 of the amplifier 234 by way of a resistor 250.

The output signal from the amplifier 174 may be applied to an input terminal 252 of the amplifier 228 by way of a resistor 254 and to the input terminal 244 of the amplifier 234 by way of a resistor 256. The input terminal 252 of the amplifier 228 may be connected to an output terminal 258 of the amplifier 228 by way of a resistor 260.

The output signal from the amplifier 176 may be applied to the input terminal 252 of the amplifier 228 by way of a resistor 262 and to the input terminal 232 of the amplifier 234 by way of a resistor 264. The output terminals 258 and 248 of the amplifiers 228 and 234 may be connected to the transmitter 130 of FIG. 4.

In operation, the input signals A – D are generated as previously described by the detector 68 of FIG. 4, amplified in the signal amplifiers 128, and are applied, respectively, to the drain electrodes of the field effect transistors 146 – 152. Since the field effect transistors 186 – 192 are in a non-conducting state and the capacitors 178 – 184 are completely discharged, the signal applied to the input terminal 196 of the amplifier 198 is initially zero. Thus, the reference voltage applied to the input terminal 208 of the amplifier 198 causes a positive voltage to be applied to the gate electrodes of the field effect transistors 146 – 152, thereby allowing the signals A, B, C, and D to be passed to the input terminals 162 – 168, respectively, of the amplifiers 170 – 176. The capacitors 178 – 184 thus begin to charge toward the input signal levels applied thereto at a rate determined by the values of the resistors 154 – 160 and the capacitors 178 – 184, i.e., the R.C. time constants of the input circuits.

The output signals from the amplifiers 170 – 176 increase in a positive direction in response to the charge on the respective capacitors 178 – 184 until the sum of the output signals applied to the input terminal 196 of the amplifier 198 is equal to the reference voltage, at which time the output signal from the amplifier 198 switches to a negative value and cuts off the field effected transistors 146 – 152. The feedback path provided by the diode 212 and the resistor 214 feeds a portion of the negative output signal from the amplifier 198 to the input terminal 208 to prevent the output signal from the amplifier 198 from going positive.

Thus, the A, B, C, and D input signals are applied to the capacitors 178 – 184 until the sum of the output signals from the amplifiers 170 – 176 is equal in amplitude to the reference voltage applied to the amplifier 198. The sum E of the output voltages from the amplifiers 170 – 176 may, where K is amplifier gain, be expressed as:

$$E = KA + KB + KC + KD \qquad 2.$$

While $K$ may vary from pulse to pulse, it is constant in all channels.

Since the charging of the capacitors 178 – 184 is effectively controlled by the sum of the output signals of the amplifiers 170 – 176, the output signals of the amplifiers 170 – 176 are related to the ratio of the illumination in each channel to the total illumination of the detector, i.e., normalized signals.

The normalized output signals A and B may then be applied to one input terminal 226 of the amplifier 228 and the normalized output signals C and D applied to the other input terminal 252 of the amplifier 228 to provide a normalized pitch error signal P ERR:

$$PERR = \frac{(A+B)-(C+D)}{A+B+C+D} \qquad (3)$$

Likewise, the normalized output signals A and D may be applied to one input terminal 232 of the amplifier 234 and the normalized signals B and C may be applied to the other input terminal 244 of the amplifier 234 to provide a normalized yaw error signal Y ERR at the output terminal 248 of the amplifier 234:

$$YERR = \frac{(A+D)-(B+C)}{A+B+C+D} \qquad (4)$$

It is apparent from the above description that the pulse processor 134 operates as a resettable sample and hold circuit which samples the input signals A, B, C, and D for a period of time determined by the sum of the input signals A, B, C, and D. In this manner, the A, B, C, and D signals are normalized and applied to a summing amplifier to provide the desired P ERR and Y ERR signals. The sampling operation may be repeated at a predetermined repetition rate by applying to the input terminal 194 a positive pulse of sufficient duration and amplitude to drive the field effect transistors 186 – 192 into saturation for a period of time sufficient to completely discharge the capacitors 178 – 184.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for remotely positioning a laser device comprising:
   illuminating means for illuminating a remote target with a beam of radiant energy;
   optical sighting means remote from said illuminating means and from said target for establishing an optical line of sight to said target;
   radiant energy detecting means carried by said optical sighting means for detecting radiant energy from said illuminating means reflected by said target and for generating error signals related to the relative positions of said optical line of sight and the detected radiant energy; and
   positioning means responsive to said error signals for varying the propagation direction of the radiant energy from said illuminating means.

2. The apparatus of claim 1 wherein said illuminating means is a laser;
   wherein the mass of said sighting means is smaller than the mass of said laser means; and wherein said positioning means is carried by said illuminating means.

3. The apparatus of claim 2 further including scan signal generating means operatively connected to said positioning means for selectively varying the propagation direction of the radiant energy from said laser means in a predetermined cyclic manner.

4. The apparatus of claim 2 further including gyroscope means carried by said positioning means for generating vibration error signals, said gyroscope means being operatively connected to said positioning means to reduce laser means vibration induced variation in the propagation direction of the radiant energy from said laser beam.

5. The apparatus of claim 4 wherein said laser means includes laser means for selectively generating a second beam of radiant energy coincident with the beam from said first-mentioned laser means, the radiant energy of said second laser means being at least an order of magnitude greater than the radiant energy of said first-mentioned laser means.

6. The apparatus of claim 2 wherein said laser means includes means for selectively generating a second beam of radiant energy coincident with the beam from said first mentioned laser means, the radiant energy of said second laser means being at least an order of magnitude greater than the radiant energy of said first mentioned laser means.

7. The apparatus of claim 6 further including gyroscope means carried by said laser means for generating vibration error signals, said gyroscope means being operatively connected to said positioning means to reduce laser means induced variation in the propagation direction of the radiant energy from said laser means.

8. Laser target illuminating apparatus comprising:
a laser;
means for modifying the direction of propagation of the radiant energy from said laser in a predetermined cyclical manner;
a remote control device for optically viewing the target, said device having a radiant energy detector aligned therewith for generating an error signal related to the relative positions of the detected energy and said detector;
means for modifying the direction of propagation of the radiant energy from said laser responsively to said error signal; and
means for selectively connecting said laser to one of said propagation direction modifying means.

9. The apparatus of claim 8 including: a second laser aligned with said first mentioned laser, the radiant energy from said second laser being at least an order of magnitude greater than the radiant energy from said first mentioned laser; and means for selectively energizing said second laser.

10. Portable apparatus for remotely positioning an illuminating device comprising:
optical sighting means remote from the illuminating device and from a target illuminated by the illuminating device for establishing an optical line of sight to the target;
radiant energy detecting means carried by said optical sighting means for detecting radiant energy from the illuminating device reflected by the target, and for generating error signals related to the relative positions of said optical line of sight and the detected radiant energy; and
positioning means responsive to said error signals and carried by the illuminating device for varying the propagation direction of the radiant energy from the illuminating device.

11. Portable apparatus for designating a target to a remote source of radiant energy comprising:
optical sighting means;
a detector of radiant energy boresighted with said optical sighting means for producing an error signal related to the position of the detected radiant energy relative to the axis of said optical sighting means; and
transmitting means for transmitting said error signals to the remote source of radiant energy.

12. The apparatus of claim 11 including handle means adapted to be grasped by a human hand and an optical filter for increasing the sensitivity of said detector to the frequency of the energy from the remote source of radiant energy.

13. The apparatus of claim 12 wherein the illuminating device is a laser and wherein the mass of said sighting means is smaller than the mass of the laser device.

14. A method of designating a remote target to be illuminated by a laser comprising the steps of:
a. generating a laser beam;
b. modifying the direction of propagation of the laser beam in a predetermined manner;
c. focusing a radiant energy detector on the target to be illuminated;
d. detecting the reflected radiant energy of the laser beam in the field of view of the detector; and
e. thereafter modifying the direction of propagation of the laser beam responsively to the position of the detected reflected radiant energy relative to the detector.

15. The method of claim 14 further including the step of increasing by at least one order of magnitude the power of the laser upon substantial centering of the detected energy in the field of the detector.

16. A method of designating a remote target to a remote source of radiant energy comprising the steps of:
a. optically acquiring the remote target thereby centering a radiant energy detector on the target;
b. detecting radiant energy from the remote source in the field of view of the target;
c. generating error signals related to the position of the detected radiant energy relative to the center of the detector; and
d. transmitting the error signals to the remote source whereby the source may be positioned to reduce the error signals.

17. A method of performing surgery comprising the steps of:
a. focusing a radiant energy detector on the tissue to be cut;
b. scanning a beam of radiant energy over tissue in the area of the tissue to be cut until detected in the field of view of the detector, said radiant energy being insufficient to cut the tissue;
c. aligning the beam of radiant energy with the detector; and d. increasing the radiant energy of the beam sufficiently to cut the tissue whereby inadvertent damage to tissue due to improper positioning of the laser is avoided.

18. The method of claim 17 wherein the radiant energy of the beam is increased by removal of an optical attenuator.

19. The method of claim 17 wherein the radiant energy of the beam is increased by the energization of a laser aligned with the first mentioned beam of radiant energy.

* * * * *